United States Patent [19]
Lin Tien

[11] Patent Number: 6,058,827
[45] Date of Patent: May 9, 2000

[54] STRUCTURE OF A TEA FLUSHING DEVICE

[76] Inventor: Yu-Mei Lin Tien, 1F, No. 14, Alley 27, Lane 216, Sec. 4, Chung Hsiao Tung Rd., Taipei, Taiwan

[21] Appl. No.: 09/324,108

[22] Filed: Jun. 2, 1999

[51] Int. Cl.$^7$ .................................................... A47J 31/02
[52] U.S. Cl. ................................. 99/299; 99/306; 99/323
[58] Field of Search ........................... 99/299, 304, 306, 99/317, 323; 210/474, 477, 478, 479, 181

[56] References Cited

U.S. PATENT DOCUMENTS

| | | | |
|---|---|---|---|
| 5,632,194 | 5/1997 | Lin | 99/299 X |
| 5,826,493 | 10/1998 | Lin | 99/299 X |
| 5,862,739 | 1/1999 | Lin | 99/299 X |

*Primary Examiner*—Reginald L. Alexander
*Attorney, Agent, or Firm*—Rosenberg, Klein & Lee

[57] ABSTRACT

A tea flushing device comprises a cup body, a filtering net, a buckling disk, and a water stopper. The bottom of the cup body is installed with a long hole for being buckled and penetrated by a buckling disk so that the cup body and the buckling disk may move upwards and downwards with respective to one another. Other than protruding from the through hole installed on the buckling disk, in a plurality of foot plates, a water stopper is installed at the through hole of the bottom of the cup body. The water stopper may be a metal rolling ball with a elastic rubber water stop pad or be formed a water stopping block and guide rod. Therefore, as the tea flushing device is flatly placed on a plane, by the supporting of the foot plate, the buckling disk will drop down naturally so that the water stopper will seal the through hole. Thus, the operation of flushing tea within the cup can be performed. If desired, the tea flushing device is only necessary to be placed at a proper container. The buckling disk will be ejected by the container so as to automatically eject the water stopper, and thus the tea water may successful drain to the container. Therefore, it has a simpler structure, and can be operated conveniently so as to have a preferred water stopping effect.

15 Claims, 11 Drawing Sheets

STRUCTURE OF A TEA FLUSHING DEVICE

BACKGROUND OF THE INVENTION

1. Field of the Invention

The present invention relates to a tea flushing device, and especially to a tea flushing device for flushing tea, and if desired, the scraps of tea leaves can be stopped and fragrant tea water may be drain out. By the compact of the present invention, the user may be operated easily and also the present invention can be used in all kinds of container for containing water.

2. Description of the Prior Art

In the prior art of flushing water, the tea is directly put into a container and then hot water is added. After a few minutes, a fragrant tea water is formed. Since tea leaves and tea water does not be isolated property. Thus, the drinker often carelessly drinks the scraps of tea. Especially, the less the tea water, the more the tea leaves being drunk by drinker. Moreover, the fragrant of tea is exhausted rapidly, thus, it can not be flushed many times. Thus, the manufacturers have developed many kinds of tea flushing devices for properly isolating the tea leaves and tea water. These structures include an outer cup and an inner cup within the outer cup. The bottom of the inner cup has a tapered shape and a through hole is formed in the center portion thereof and a rolling ball water stopper located at the through hole. A filtering net is located thereon. A linkage extended to the exact lower side of the through hole is installed between one side of the inner cup and the bottom for flushing tea water. If desired, the linkage is pressed to eject the rolling ball, then the tea is filtered through a filtering net and then flows to the outer cup. Thus a pure tea water is obtained. After the linkage is released, hot water may be added continuously, therefore, the tea can be flushed many times.

However, in that tea flushing device structure, since the rolling ball freely slides between the bottom of the inner cup and the space of the filtering net so not to be confined properly, if the cup body is inclined for pouring water or the cup body is vibrated, the rolling ball will roll away from the through hole so that the water will drain out. Besides, since the material of the bottom of inner cup is made of plastic. Thus, in manufacturing, the sizes and the shapes of the rolling ball and the tea flushing device can not be matched completely. Therefore, gaps will occur between the rolling ball and the through hole so that the water will pour out continuously. Moreover, since the structure is necessary to be arranged with linkage and spring and other components, thus not only it has a complex structure, but also the operation is also complex and it is easy to fault. Especially, the inner cup and the outer cup must be used together. Therefore, as the upper half space of the outer cup is occupied by the inner cup, the space in the lower half for receiving water is finite. Thus, it can not be used in other container.

SUMMARY OF THE INVENTION

Accordingly, the object of the present invention is to provide a tea flushing device, when the tea flushing device is flatly arranged on a plane, it may stop water to drain out automatically for flushing water. If the cup body is placed in a proper container, it will pour water automatically and then tea water may drain out to the container. Thus, not only having a simple structure, but also a simple placing action may serve to control the input and output of water.

Another object of the present invention is to provide a tea flushing device, in order that as the tea flushing device is inclined or vibrates, the water therewithin may still position steadily. Thus, the tea will not drain out.

A further object of the present invention is to provide a tea flushing device, wherein by an elastic deformed rubber water stopping pad so that the water stopper can be retained to tightly seal the water stopping pad by the gravitation itself and water pressure. Thus, a preferred water sealing effect is provided. Therefore, tea water will not drain out in a static state.

The present invention will be better understood and its numerous objects and advantages will become apparent to those skilled in the art by referencing to the following drawings in which:

DETAILED DESCRIPTION OF THE PREFERRED EMBODIMENT

Figure 1:
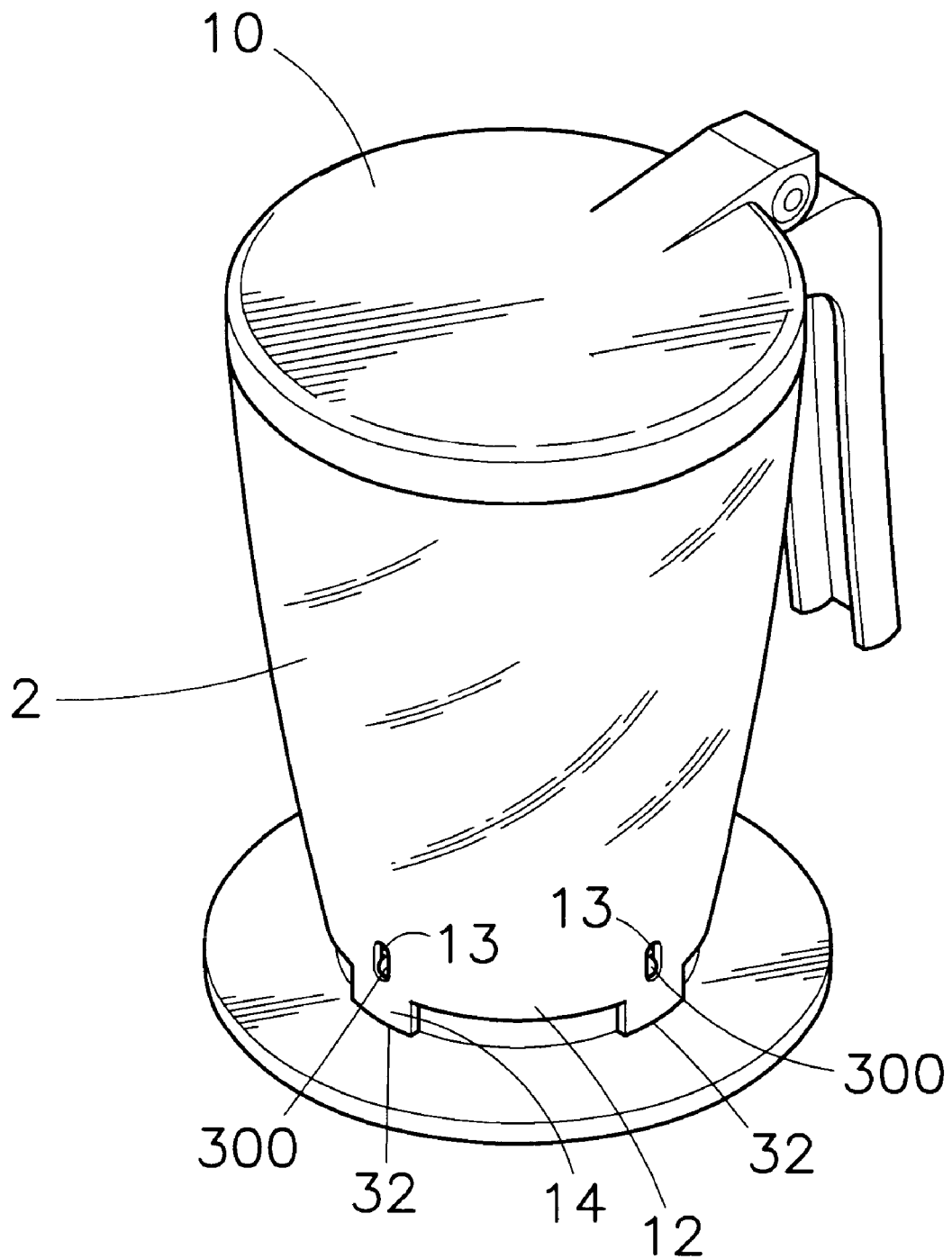
FIG. 1 is a perspective view showing the structure of the present invention.
Figure 2:
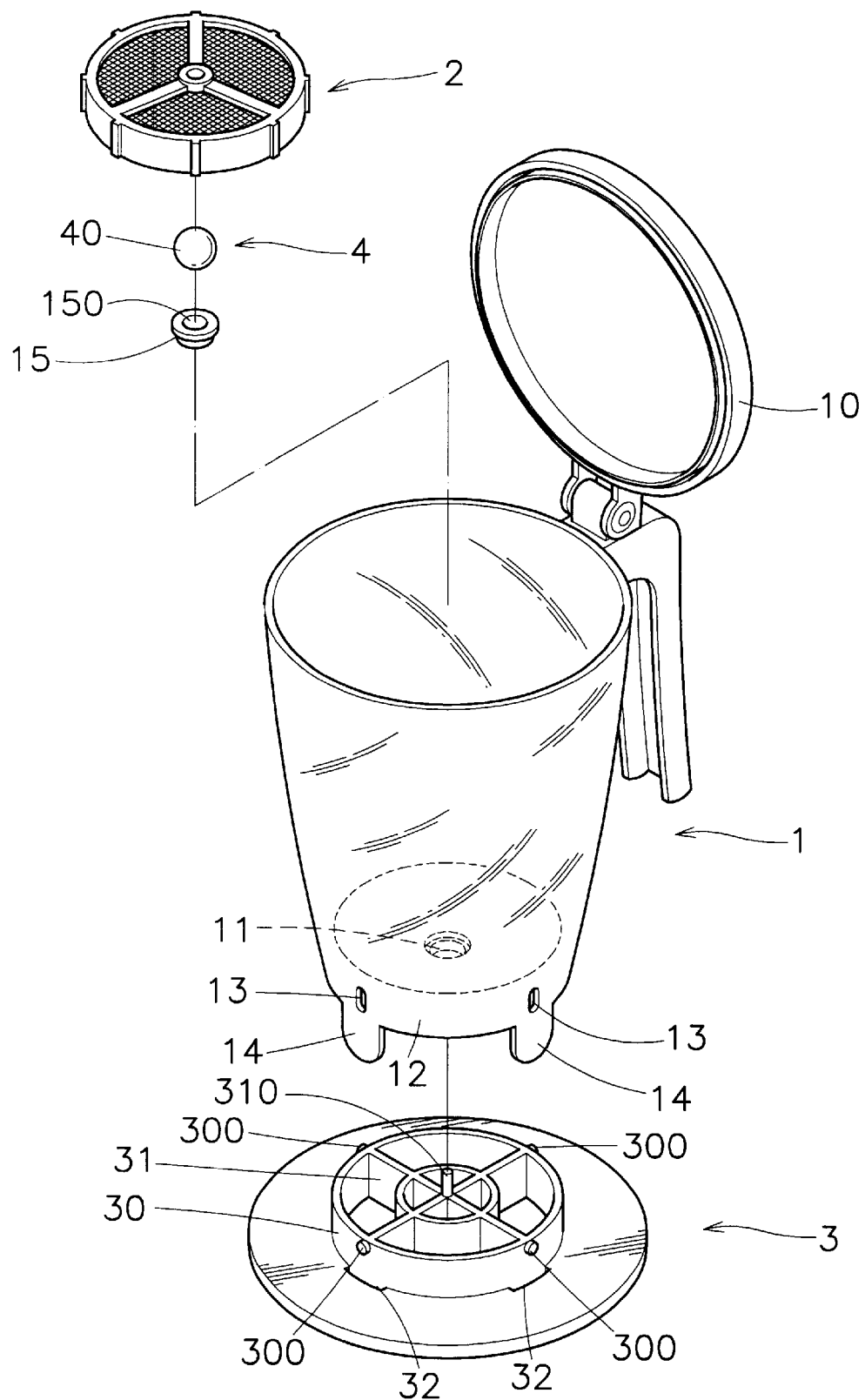
FIG. 2 is an exploded perspective view of the first embodiment according to the present invention.
Figure 3:
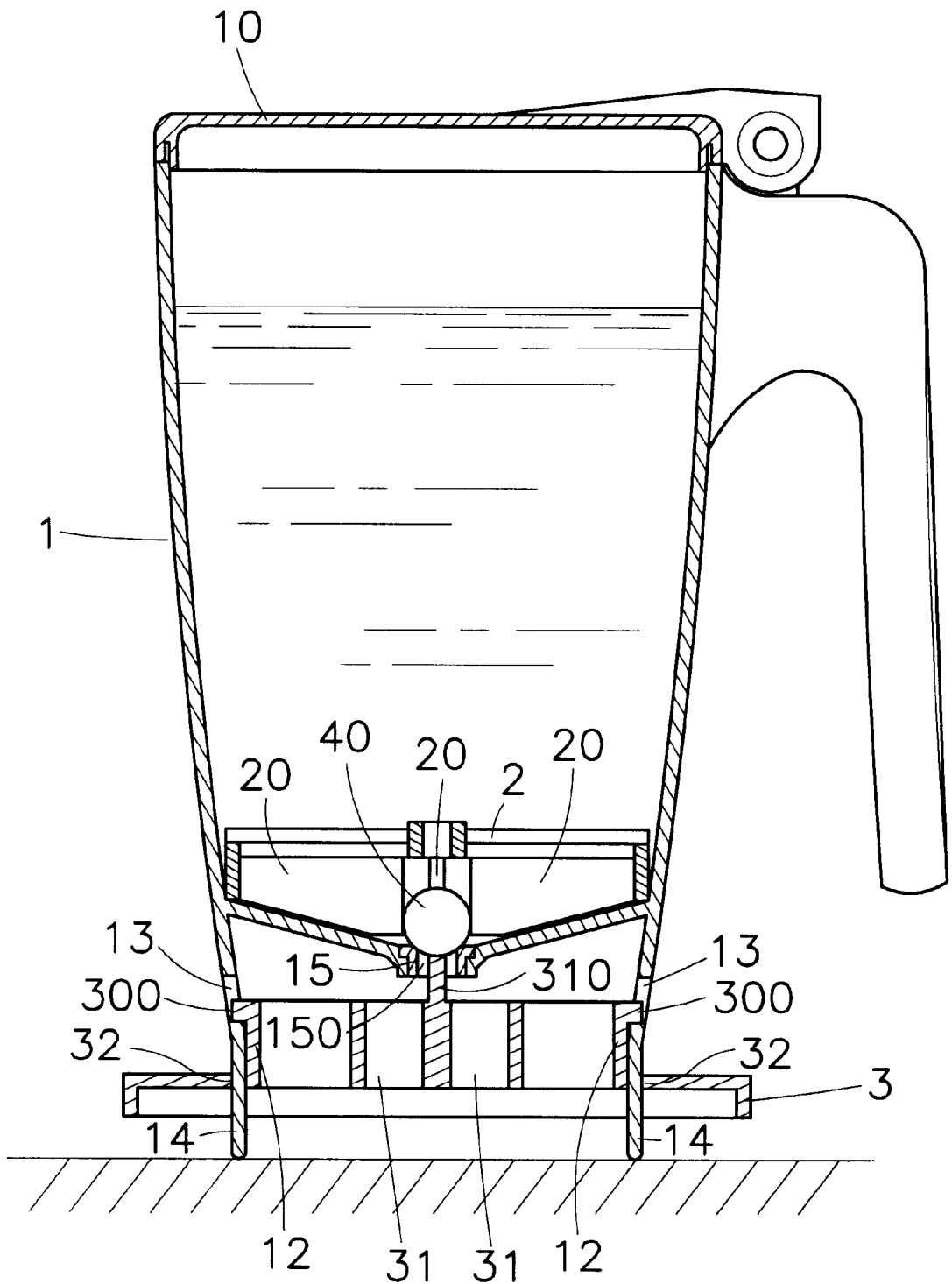
FIG. 3 is a lateral cross sectional view showing the cup body in the first embodiment in placed at a plane and water is stopped.
Figure 8:
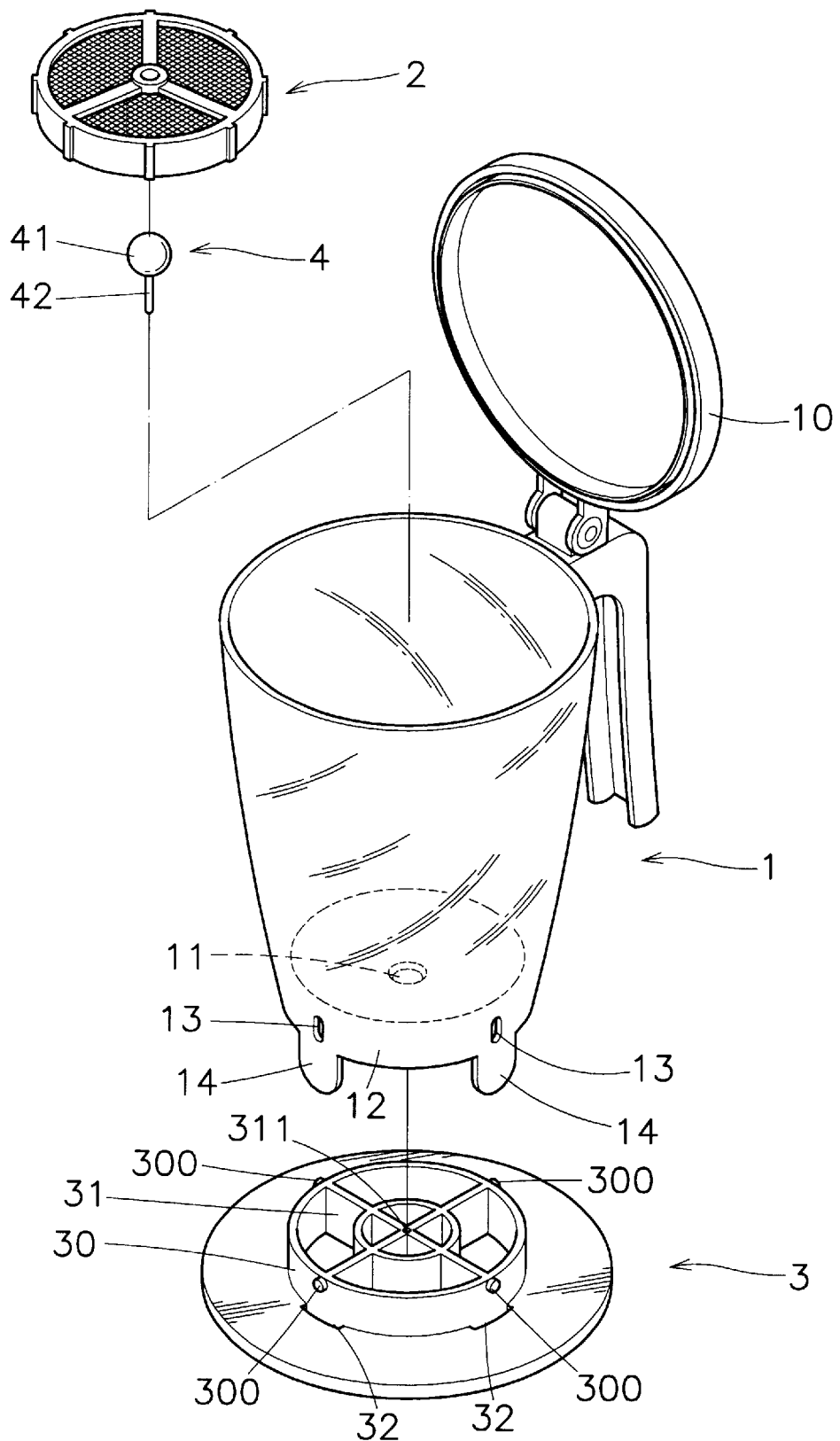
FIG. 8 is an exploded perspective view of the third elastic element according to the present invention.

Referring to FIGS. 2, 3 and 8, three embodiments of the improved tea flushing device according to the present invention are illustrated. All the tea flushing devices in the three embodiments include a cup body 1, a filtering net 2, a buckling disk 3 and a water stopper 4.

The cup body 1 has a matched cover 10. The bottom of the cup has a cone shape inclined surface. A through hole 11 is installed in the center of the bottom. A flange 12 with a proper height is extended from the periphery of the cup bottom. A plurality of symmetric vertical long holes 13 are formed on the wall surface of the flange 12. A plurality of paired and symmetric foot plates 14 are extended from the flange 12.

The filtering net 12 is installed in the bottom of the cup body 1 and isolated with the through hole 11.

The buckling disk 3 is formed with a ring 30 with a diameter slightly smaller than the flange 12 of the cup 1. The peripheral wall of the ring 30 is installed with a plurality of symmetric buckling posts 300 so as to be inserted into the long holes 13 of the flange 12 of the cup body 1. Thus, the cup body 1 and the buckling disk 3 may be therefore lifted or descended. A plurality of interleaved and hollow fixing ribs 31 are arranged on the center of the ring 30. A rod 310 is installed in the center of the fixing rib 31. A plurality of through holes 32 for being penetrating by the foot plates 14 are installed on the buckling disk 3 adjacent to ring 30.

Figure 5:
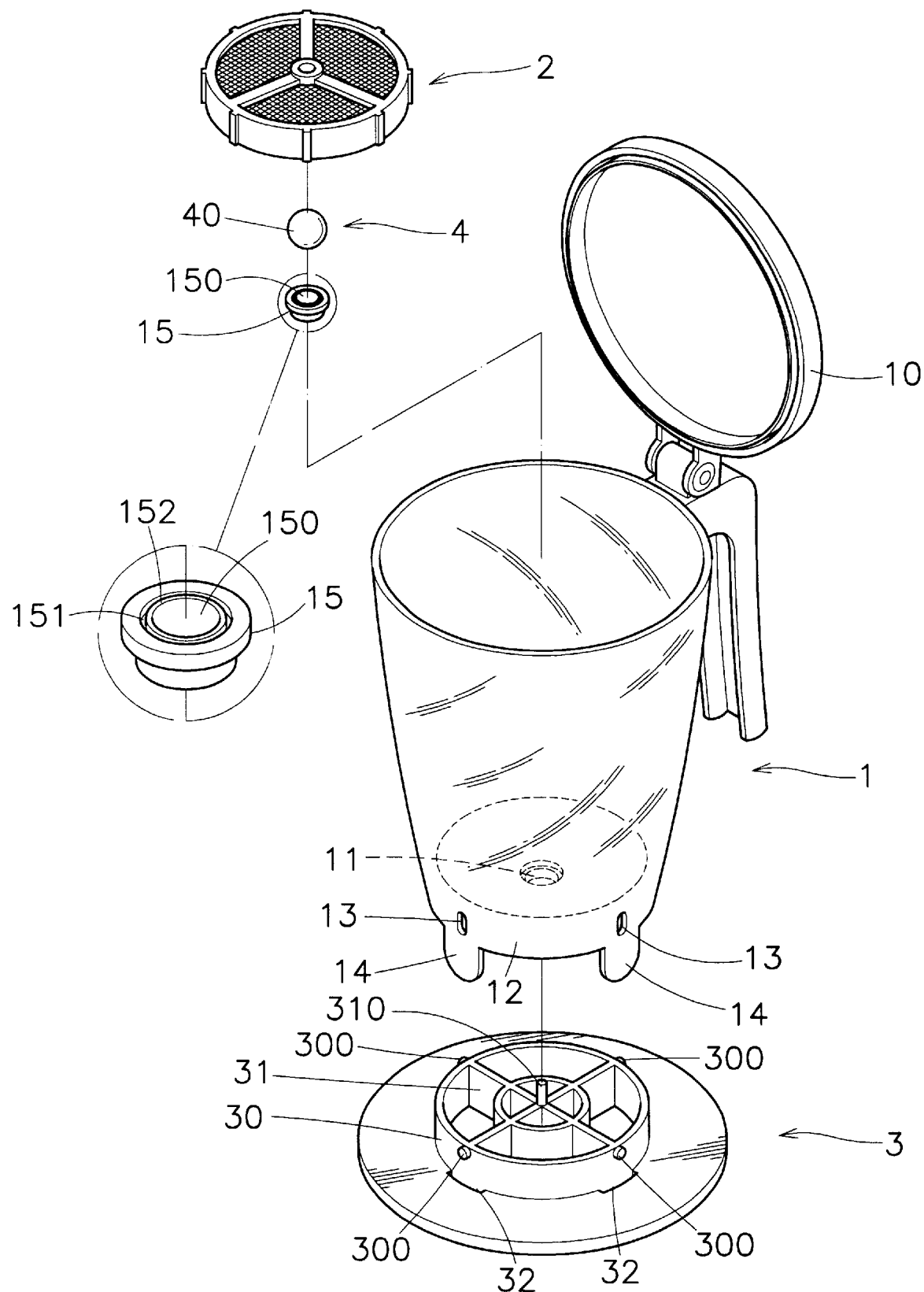
FIG. 5 is an exploded perspective view of the second embodiment according to the present invention.
Figure 6:
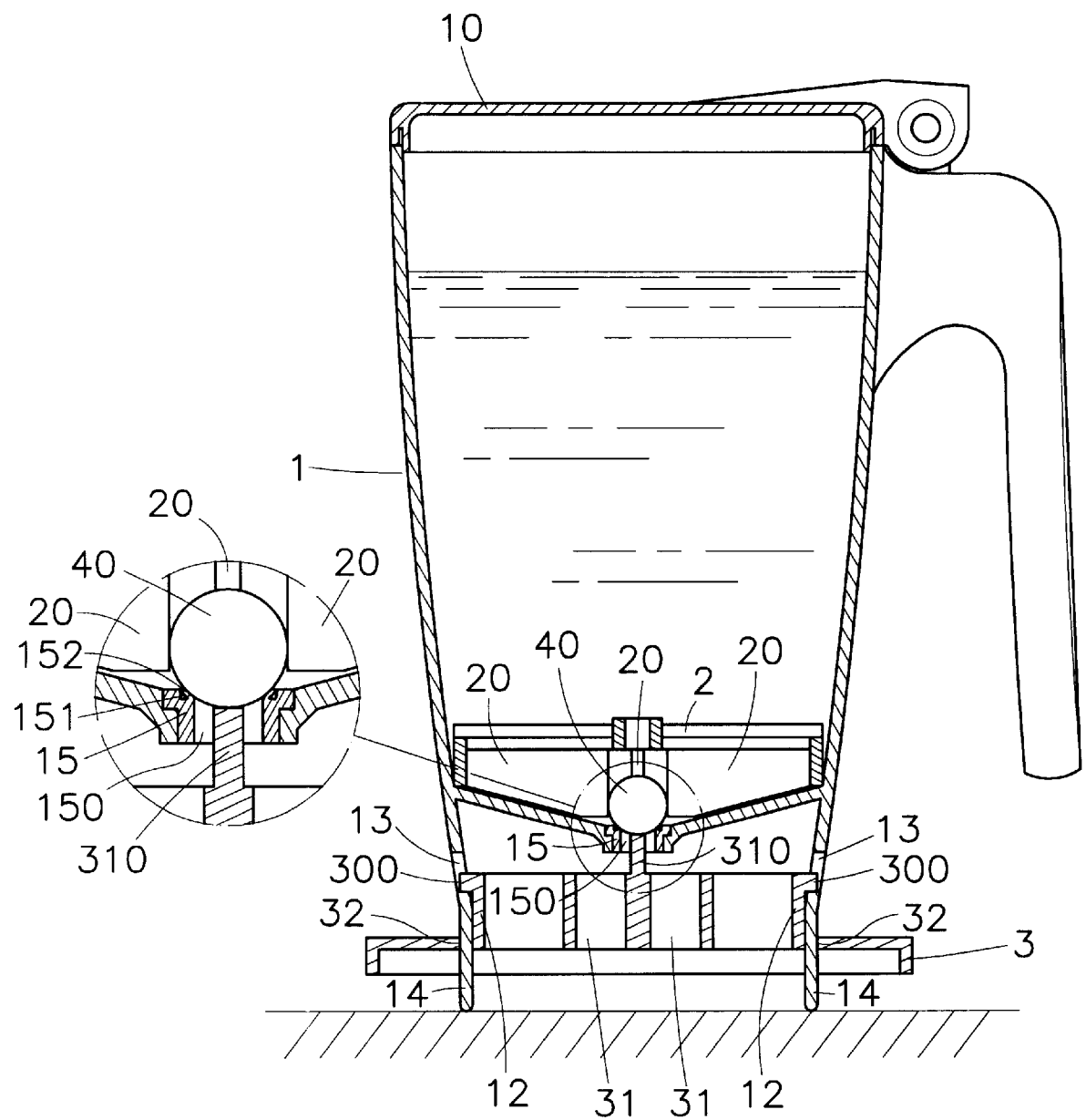
FIG. 6 is a lateral cross sectional view showing the cup body in the second embodiment in placed at a plane and water is stopped.
Figure 11:
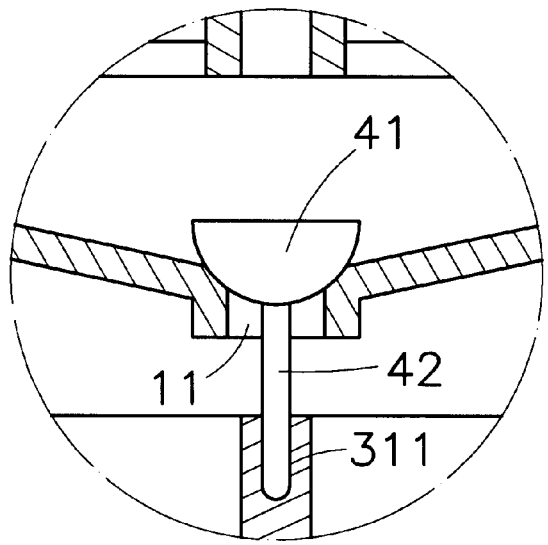
FIG. 11 is a structural schematic view showing the water stopper of another aspect in the third embodiment.
Figure 12:
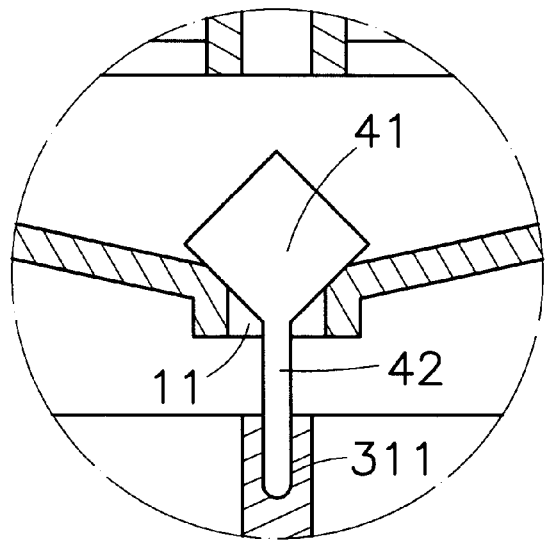
FIG. 12 is a structural cross sectional view showing the water stopper of another aspect in the third embodiment.

As the first embodiment shown in FIGS. 2 and 3, a rubber water stopping pad 15 with rich telescopic elasticity is installed at the through hole 11 of the cup body 1. The water stopper 4 is a metal rolling ball 40. A bottom of the filtering net 2 is downwards extended with a protecting body enclosing the rolling ball 40. The protecting body has a shape of a plurality of symmetrically radiating ribs 20 or a plurality of posts or round cylinders so that the center section enclosed is exactly contained the rolling ball 4 and confines the movement of the rolling ball 4. The second embodiment is shown in FIGS. 5 and 6, in the embodiment the water stopper 4 has a shape of metal rolling ball 40. The filtering net 2 is also installed with a protecting body with proper distributed ribs 20. A rubber water stopping pad 15 is installed at the through hole 11 except that the water stopping pad 15 facing the top surface of the rolling ball 40 and near the through hole 150 installed with a circular slot 151 so as to be isolated and formed with a thinner water stopping ring 152. Further, as that shown in FIGS. 8 and 9, the third embodiment of the present invention is illustrated. The water stopper 4 is formed by a water stopping block 41 with a geometric shape of for example round ball, hemispherical as shown in FIG. 11, or a tapered shape as shown in FIG. 12, and a guiding rod 42 connected to bottom of the center of the water stopping block 41. A center portion of the buckling disk 3 is formed with a concave hole 311 facing exactly to the guide rod 42.

Figure 4:
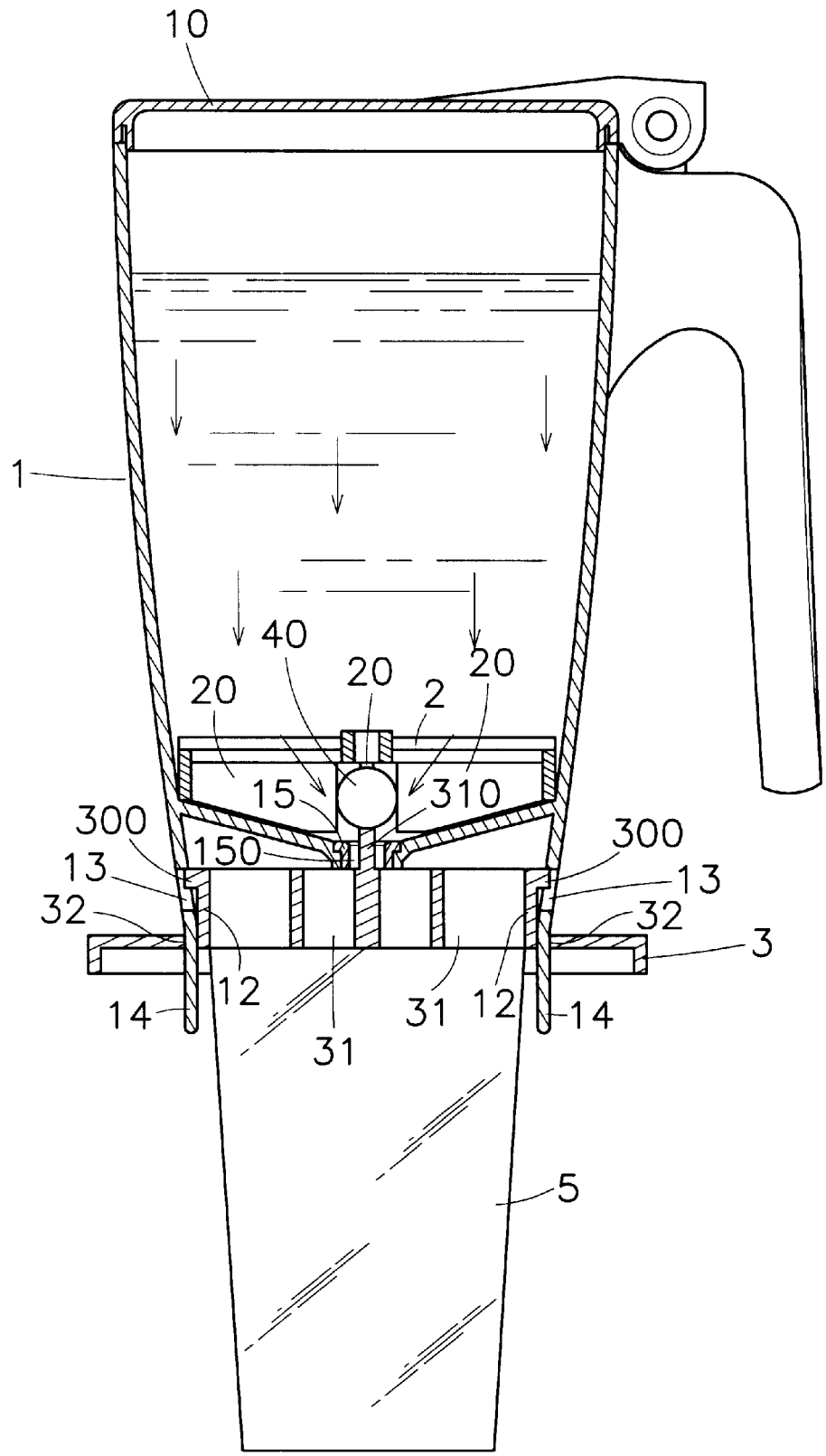
FIG. 4 is a lateral cross sectional view showing the cup body in the first embodiment is placed in the proper container and water is drained out.
Figure 7:
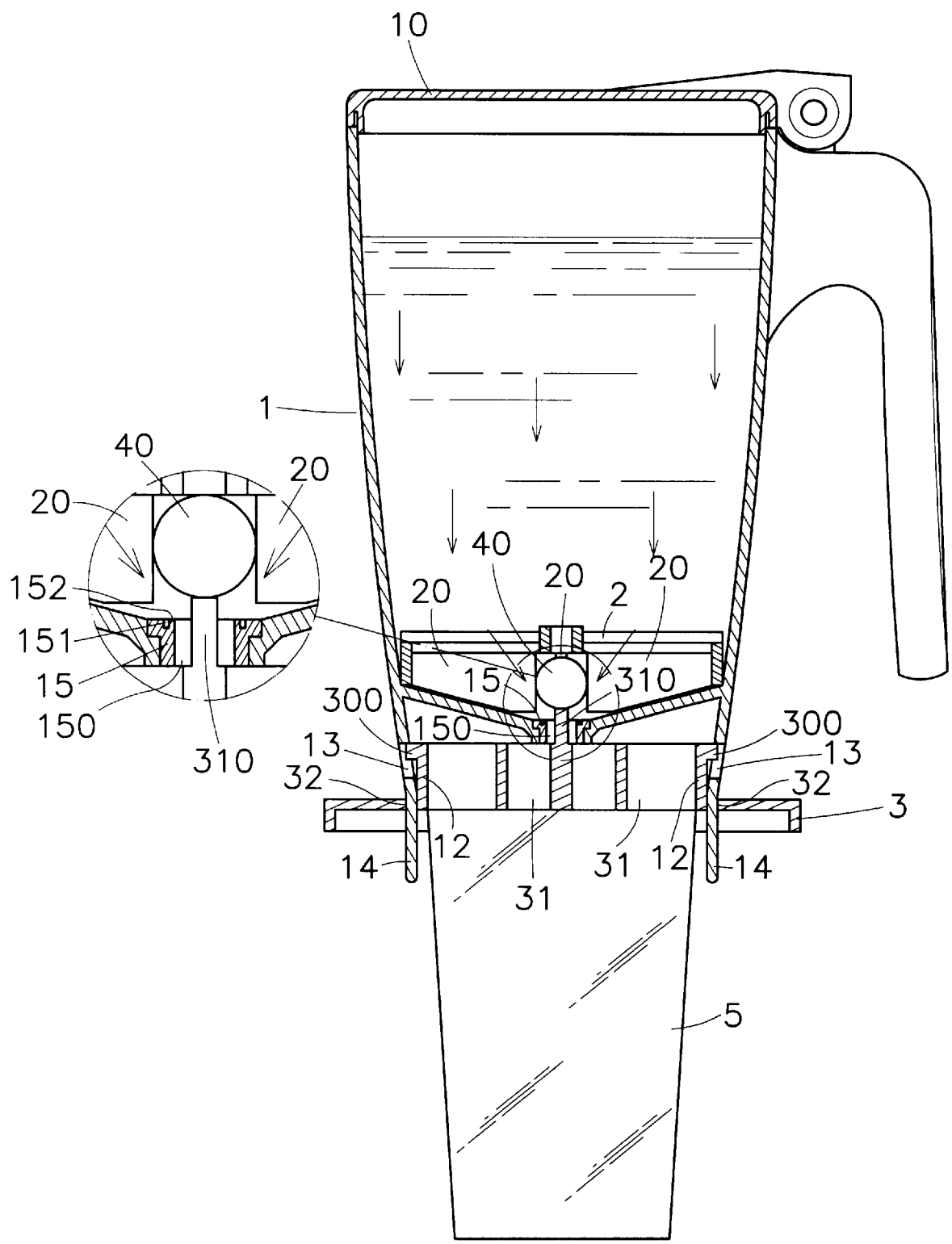
FIG. 7 is a lateral cross sectional view showing the cup body in the second embodiment is placed in the proper container and water is drained out.
Figure 9:
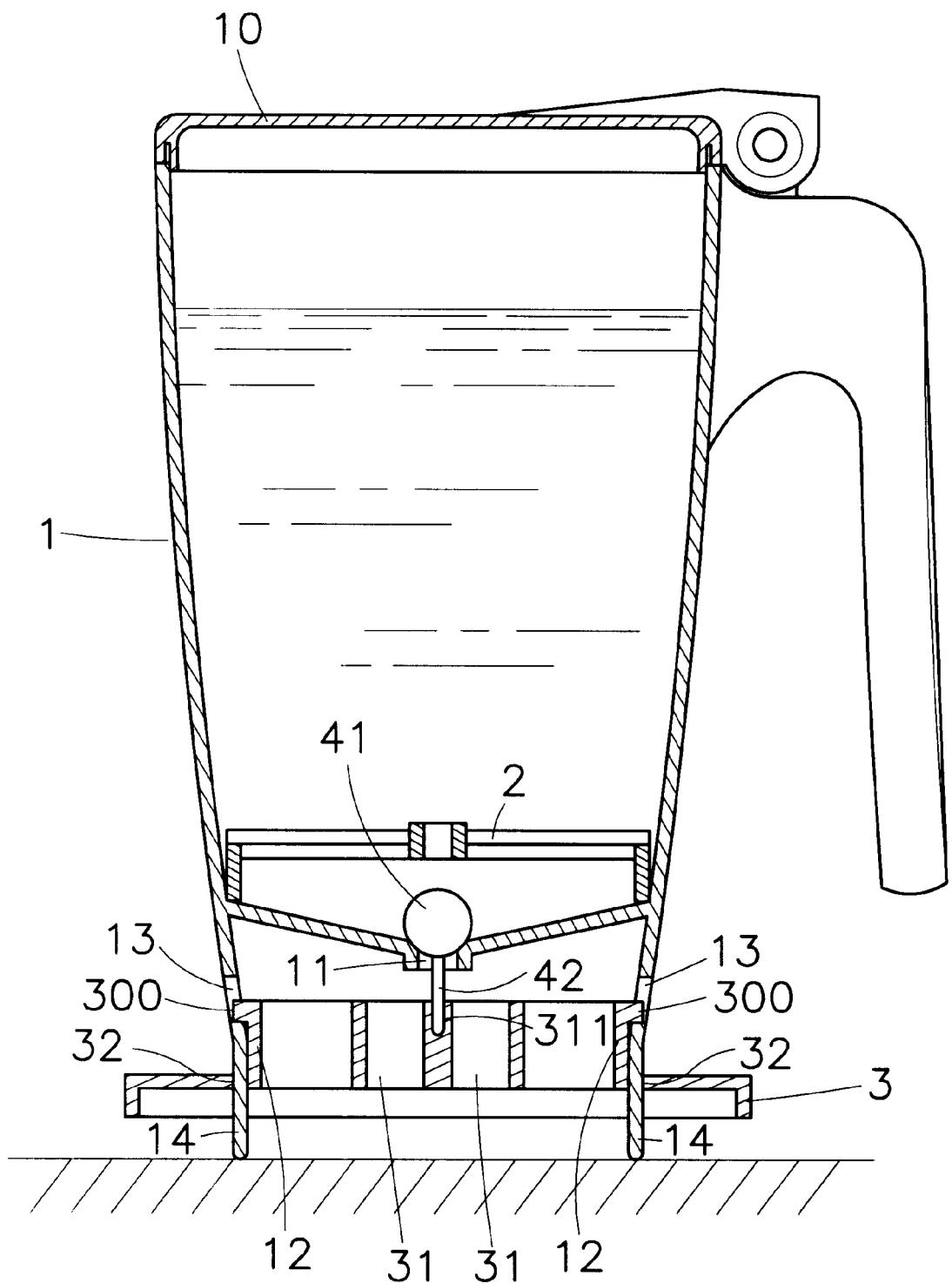
FIG. 9 is a lateral cross sectional view showing the cup body in the third embodiment in placed at a plane and water is stopped.
Figure 10:
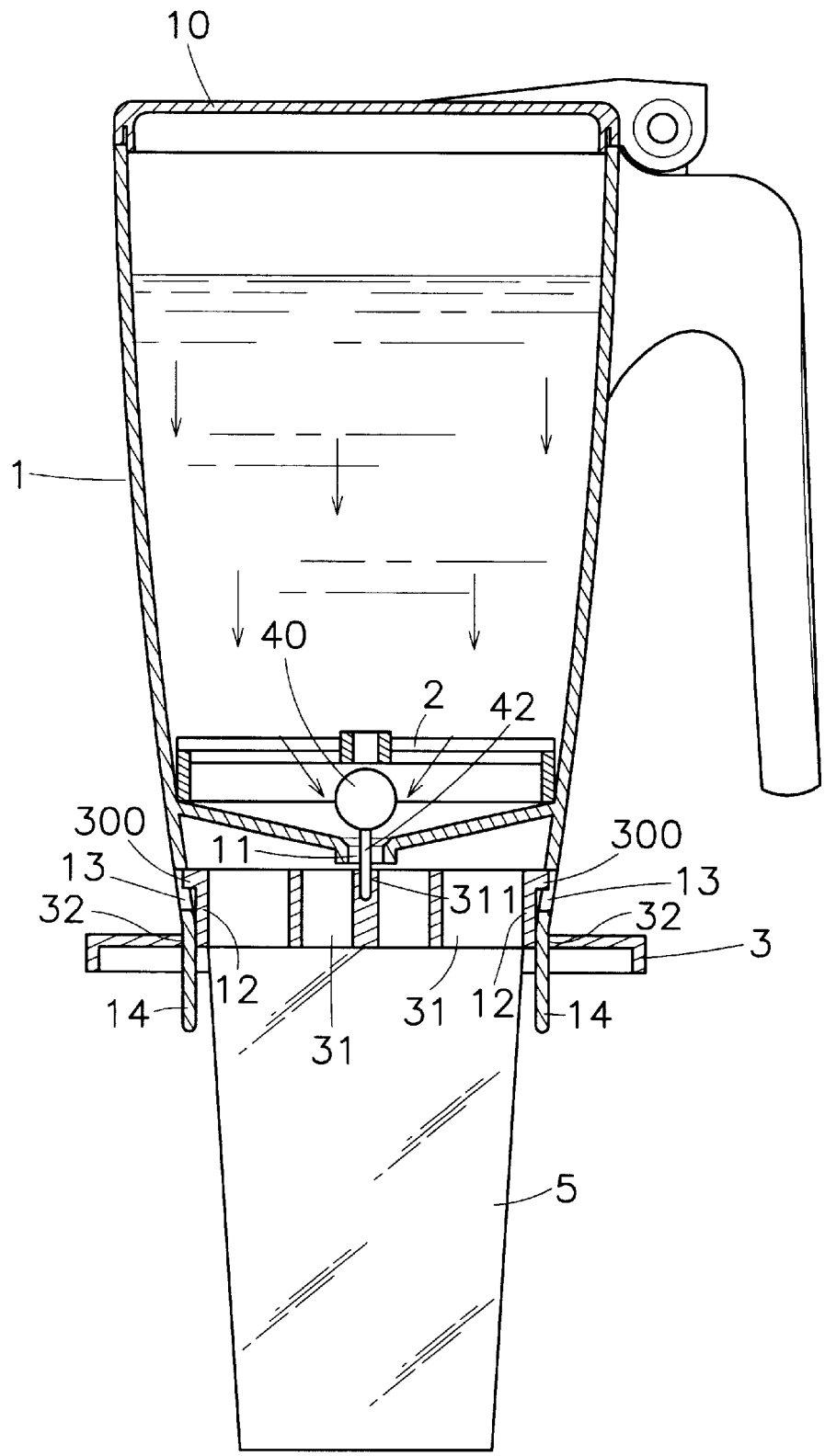
FIG. 10 is a lateral cross sectional view showing the cup body in the second embodiment is placed in the proper container and water is drained out.

By the aforementioned components, the tea flushing device as shown in FIG. 2 is assembled. As shown in FIGS. 3, 6 and 9, when the cup body 1 is flatly arranged on the plane, for example, table surface, and then tea and hot water is filled into the cup. By the supporting of the foot plate 14, the buckling disk 13 will slide downwards along the long hole 13 due to action of gravitation force and then the water stopper is released so that the water stopper 4 will resist against the through hole 11 (15) because of the water pressure and the gravitational itself, and thus water is tightly sealed, and therefore operation of flushing tea can be performed. When the tea is desired to be taken out for drinking, the user only needs to place the cup body 1 to any container 5 with a diameter smaller than the outer diameter of the buckling disk 3 except one having a diameter identical to that of the flange 12, and then the container 5 will resist against the buckling disk 3, as shown in FIGS. 4, 7 and 10, the cup body 1 descends according to the gravitational force itself. Therefore, the top rod 310 or concave hole 311 of the buckling disk 3 will resist against the water stopper 4 to move away from the through hole 11 (150), thus the tea water within the cup body 1 will be poured successfully to the container 5. At the same time, the tea leaves and the scraps will be isolated by the filtering of the filtering net 2 so as not to flow with the tea water.

Therefore, it is appreciated that in using the user only needs to place the cup body 1 flatly on a plane, then the water stopper 4 will automatically seal the through hole 11 (150) to achieve the function of stopping water so to flush water easily. As desired, the cup body 1 is only necessary to be placed above the container 5 and then the water stopper 4 will separate automatically and then tea water will be poured out. Thus it has a simple structure and the user does not be necessary to perform any extra pressing action, he (or she) only needs to place the cup body, then the stopping and releasing of water are performed. Thus it can be operated conveniently. Especially, the cup body 1 can be used independently and is suitable to any container 5 with a proper size. Thus, user may use the container 5 with a proper volume for being filled with water.

Another, since the tea flushing device 1 and the container 5 for containing water are separated with one another. Therefore, as the tea water 5 within the container 5 is poured out, the whole tea flushing device can be taken away and is not necessary to be inclined. Therefore, the water stopper 4 itself is steadily. Especially, in the first embodiment shown in FIGS. 3 and 4, and the second embodiment shown in FIGS. 6 and 7, the water stopper 4 with a type of rolling ball 40 is more easily confined by the plurality of ribs 20 under the filtering net 2, thus it is positioned and will not roll anywhere. In the third embodiment shown in FIGS. 9 and 10, since the water stopper 4 has a guide rod 42 passing into the through hole 11, and it will not separate with the through hole 11. Thus, the water stopper 4 is effectively positioned in the through hole 11 (150) and thus a preferred water stopping effect is retained. Besides, in the first embodiment shown in FIG. 3 and the second embodiment shown in FIG. 6, a soft rubber water stopping pad 15 is adapted. Therefore, when the rolling ball 40 resists against the water stopping pad 15 due to the gravitational force and water pressure, since the peripheral wall of the through hole 150 may be properly compressed and deformed so as to tightly seal with the rolling ball 40. Especially in the second embodiment, a soft thin water stopping ring 152 is extra isolated from the periphery of the through hole 150 of the water stopping pad 15, thus as it is pressed by the rolling ball 40, a larger deformation is induced so as to resist against the rolling ball 40. Therefore, when even a little error is existed between the rolling ball 40 and the through hole 150, the tightly sealing effect for stopping water between will not be affected and the tea water will not pour out.

However, a tea flushing device serves as an embodiment in the present invention, another applications, such as device for flushing coffee or drug, are all within the scope and spirit of the present invention.

Although the present invention has been described using specified embodiment, the examples are meant to be illustrative and not restrictive. It is clear that many other variations would be possible without departing from the basic approach, demonstrated in the present invention. Therefore, all such variations are intended to be embraced within the scope of the invention as defined in the appended claims.

What is claimed is:

1. A tea flushing device comprising:
    a cup body the bottom of which having a cone shape inclined surface, a through hole being installed in the center of the bottom, a flange with a proper height being extended from the periphery of the cup bottom, a plurality of symmetric vertical long holes being formed on the wall surface of the flange, and a plurality of paired and symmetric foot plates being extended from the flange;

a filtering net being installed in the bottom of the cup body;

a buckling disk being formed with a ring having a diameter slightly smaller than the flange of the cup, the peripheral wall of the ring being installed with a plurality of symmetric buckling posts so as to be inserted into the respective long holes of the flange in the cup body, thus, the cup body and the buckling disk is capable of being lifted or descended, a rod being further installed in the center of the ring, and a plurality of through holes for being penetrating by the foot plates are installed on the buckling disk adjacent to the ring;

a water stopper, this water stopper further comprising a soft water stopping pad installed at the through hole on the bottom of the cup body and a metal rolling ball placed on the through hole of the water stopping pad, wherein the water stopping pad facing the top surface of the rolling ball and near the through hole installed with a circular slot so as to be isolated and formed with a thinner water stopping ring;

wherein, when the cup body is flatly arranged on the plane, by supporting of the foot plate, the buckling disk will slide downwards along the long hole due to action of gravitation force and then the water stopper is released so that the water stopper will resist against the through hole because of the water pressure and the gravitational itself, and thus water is tightly sealed, when the tea flushing device is placed on any container with a proper diameter, the buckling disk will be resisted by the container so that the water stopper moves away from the through hole, and thus the liquid within the cup will be filtered by the filtering net and then the liquid will flow into the container through the through hole.

2. A tea flushing device according to claim 1, wherein a protecting body extended downwards to enclose the periphery of the rolling ball is installed at the bottom of the filtering net.

3. A tea flushing device according to claim 1, wherein the protecting body is a plurality of radiating extending ribs.

4. A tea flushing device according to claim 2, wherein the protecting body is a round convex barrel.

5. A tea flushing device according to claim 1, wherein the ring of buckling disk is formed with a plurality of interleaved fixing ribs so as to have a hollow space.

6. A tea flushing device comprising:

a cup body the bottom of which having a cone shape inclined surface, a through hole being installed in the center of the bottom, a flange with a proper height being extended from the periphery of the cup bottom, a plurality of symmetric vertical long holes being formed on the wall surface of the flange, and a plurality of paired and symmetric foot plates being extended from the flange;

a filtering net being installed in the bottom of the cup body;

a buckling disk being formed with a ring with a diameter slightly smaller than the flange of the cup, the peripheral wall of the ring being installed with a plurality of symmetric buckling posts so as to be inserted into the respective long holes of the flange in the cup body, thus, the cup body and the buckling disk is capable of being lifted or descended, a rod being further installed in the center of the ring, and a plurality of through holes for being penetrating by the foot plates are installed on the buckling disk adjacent to the ring;

a water stopper, this water stopper further comprising a soft water stopping pad installed at the through hole on the bottom of the cup body and a metal rolling ball placed on the through hole of the water stopping pad;

wherein, when the cup body is flatly arranged on the plane, by supporting of the foot plate, the buckling disk will slide downwards along the long hole due to action of gravitation force and then the water stopper is released so that the water stopper will resist against the through hole because of the water pressure and the gravitational itself, and thus water is tightly sealed, when the tea flushing device is placed on any container with a proper diameter, the buckling disk will be resisted by the container so that the water stopper moves away from the through hole, and thus the liquid within the cup will be filtered by the filtering net and then the liquid will flow into the container through the through hole.

7. A tea flushing device according to claim 6, wherein a protecting body extended downwards to enclose the periphery of the rolling ball is installed at the bottom of the filtering net.

8. A tea flushing device according to claim 7, wherein the protecting body is a plurality of radiating extending ribs.

9. A tea flushing device according to claim 7, wherein the protecting body is a round convex barrel.

10. A tea flushing device according to claim 6, wherein the ring of buckling disk is formed with a plurality of interleaved fixing ribs so as to have a hollow space.

11. A tea flushing device comprising:

a cup body the bottom of which having a cone shape inclined surface, a through hole being installed in the center of the bottom a flange with a proper height being extended from the periphery of the cup bottom, a plurality of symmetric vertical long holes being formed on the wall surface of the flange, and a plurality of paired and symmetric foot plates being extended from the flange;

a filtering net being installed in the bottom of the cup body;

a buckling disk being formed with a ring with a diameter slightly smaller than the flange of the cup, the peripheral wall of the ring being installed with symmetric plurality of buckling posts so as to be inserted into the respective long holes of the flange of the cup body, thus, the cup body and the buckling disk is capable of being lifted or descended, a concave hole being further installed in the center of the ring, and a plurality of through holes for being penetrating by the foot plates being installed on the buckling disk adjacent to the ring;

a water stopper formed by a water stopping block and a guiding rod connected to bottom of the center of the water stopping block;

wherein, when the cup body is flatly arranged on the plane, by the supporting of the foot plate, the buckling disk will slide downwards along the long hole due to action of gravitation force and then the water stopper is released so that the water stopper will resist against the through hole because of the water pressure and the gravitational itself, and thus water is tightly sealed, when the tea flushing device is placed on any container with a proper diameter, the buckling disk will be resisted by the container so that the water stopper moves away from the through hole, and thus the liquid within the cup will be filtered by the filtering net and then the liquid will flow into the container through the through hole.

12. A tea flushing device according to claim 11, wherein the water stopping block has a shape of round ball.

13. A tea flushing device according to claim 11, wherein the water stopping block has a shape of hemisphere.

14. A tea flushing device according to claim 11, wherein the water stopping block has a tapered shape.

15. A tea flushing device according to claim 11, wherein the ring of buckling disk is formed with a plurality of interleaved fixing ribs so as to have a hollow space.

* * * * *